United States Patent
Eastwood et al.

(10) Patent No.: US 9,297,536 B2
(45) Date of Patent: Mar. 29, 2016

(54) GAS TURBINE ENGINE COMBUSTOR SURGE RETENTION

(75) Inventors: Jonathan Jeffery Eastwood, Newington, CT (US); Kevin Joseph Low, Portland, CT (US)

(73) Assignee: United Technologies Corporation, Hartford, CT (US)

( * ) Notice: Subject to any disclaimer, the term of this patent is extended or adjusted under 35 U.S.C. 154(b) by 1058 days.

(21) Appl. No.: 13/460,998

(22) Filed: May 1, 2012

(65) Prior Publication Data

US 2013/0291544 A1 Nov. 7, 2013

(51) Int. Cl.
| | |
|---|---|
| F23R 3/50 | (2006.01) |
| F23R 3/60 | (2006.01) |
| F02C 7/20 | (2006.01) |
| F23R 3/00 | (2006.01) |
| F01D 25/24 | (2006.01) |

(52) U.S. Cl.
CPC . *F23R 3/50* (2013.01); *F01D 25/24* (2013.01); *F23R 3/002* (2013.01); *F23R 3/60* (2013.01); *F02C 7/20* (2013.01); *F23R 2900/00005* (2013.01)

(58) Field of Classification Search
CPC ............... F23R 3/50; F23R 3/52; F23R 3/60; F23R 3/002; F02C 7/20
See application file for complete search history.

(56) References Cited

U.S. PATENT DOCUMENTS

| | | | |
|---|---|---|---|
| 3,844,116 A * | 10/1974 | Matto | 60/800 |
| 4,191,011 A | 3/1980 | Sweeney et al. | |
| 4,549,402 A | 10/1985 | Saintsbury et al. | |
| 4,679,400 A * | 7/1987 | Kelm et al. | 60/722 |
| 4,785,623 A * | 11/1988 | Reynolds | 60/796 |
| 5,289,677 A * | 3/1994 | Jarrell | 60/796 |
| 5,685,157 A | 11/1997 | Pandalai et al. | |
| 5,848,874 A * | 12/1998 | Heumann et al. | 415/189 |
| 6,347,508 B1 | 2/2002 | Smallwood et al. | |
| 6,397,603 B1 | 6/2002 | Edmondson et al. | |
| 6,536,216 B2 * | 3/2003 | Halila et al. | 60/737 |
| 6,986,201 B2 | 1/2006 | Moertle et al. | |
| 7,000,406 B2 | 2/2006 | Markarian et al. | |

(Continued)

FOREIGN PATENT DOCUMENTS

KR 2019980020073 U 7/1998

OTHER PUBLICATIONS

International Preliminary Report on Patentability for PCT Application No. PCT/US2013/038572, mailed Nov. 13, 2014.

(Continued)

*Primary Examiner* — Phutthiwat Wongwian
*Assistant Examiner* — Rene Ford
(74) *Attorney, Agent, or Firm* — Carlson, Gaskey & Olds, P.C.

(57) ABSTRACT

A combustor assembly for a gas turbine engine includes a static structure and an annular combustor extending around a central axis and located radially inwards of the static structure. The annular combustor includes an annular outer shell and an annular inner shell that define an annular combustion chamber there between. The annular combustor is free of any rigid attachments directly between the static structure and the annular outer shell. The annular outer shell includes a radially-outwardly extending flange. A stop member is rigidly connected with the static structure and is located adjacent the radially-outwardly extending flange such that axial-forward movement of the annular combustor is limited.

22 Claims, 6 Drawing Sheets

(56) References Cited

U.S. PATENT DOCUMENTS

| | | | |
|---|---|---|---|
| 7,093,440 B2 | 8/2006 | Howell et al. | |
| 7,416,362 B2 * | 8/2008 | North | 403/30 |
| 7,861,530 B2 | 1/2011 | Hawie et al. | |
| 7,900,461 B2 * | 3/2011 | Varney et al. | 60/800 |
| 8,266,914 B2 * | 9/2012 | Hawie et al. | 60/800 |
| 8,752,395 B2 * | 6/2014 | McCormick et al. | 60/796 |
| 2004/0118127 A1 * | 6/2004 | Mitchell et al. | 60/796 |
| 2004/0154303 A1 | 8/2004 | Mitchell et al. | |
| 2005/0072163 A1 * | 4/2005 | Wells et al. | 60/796 |
| 2009/0288422 A1 * | 11/2009 | Cernay et al. | 60/800 |
| 2011/0120133 A1 | 5/2011 | Rudrapatna et al. | |
| 2011/0120141 A1 * | 5/2011 | Geary | 60/796 |
| 2013/0152591 A1 * | 6/2013 | Dery et al. | 60/753 |
| 2014/0318148 A1 * | 10/2014 | Clemen et al. | 60/796 |

OTHER PUBLICATIONS

International Search Report for International Application No. PCT/US2013/038572 completed on Aug. 22, 2013.

* cited by examiner

GAS TURBINE ENGINE COMBUSTOR SURGE RETENTION

BACKGROUND

This disclosure relates to a combustor and, more particularly, to controlling position of a combustor.

Combustors, such as those used in gas turbine engines, typically include radially spaced inner and outer liners that define an annular combustion chamber in between. A bulkhead panel is provided at a forward end of the chamber to shield a forward section of the combustor from the relatively high temperatures in the chamber. A plurality of fuel nozzles extend into the combustor through the forward end and into the bulkhead panel to provide fuel to the combustor.

SUMMARY

A combustor assembly for a gas turbine engine according to an aspect of the present disclosure includes a static structure and an annular combustor extending around a central axis and being located radially inwards of the static structure. The annular combustor includes an annular outer shell and an annular inner shell that define an annular combustion chamber there between. The annular combustor is free of any rigid attachments directly between the static structure and the annular outer shell. The annular outer shell includes a radially-outwardly extending flange. A stop member is rigidly connected with the static structure and is located adjacent the radially-outwardly extending flange such that axial-forward movement of the annular combustor is limited.

In a further non-limiting embodiment of the any of the foregoing embodiments, the stop member is axially-forwardly spaced apart by a distance D from the radially-outwardly extending flange such that movement of the annular combustor is limited to an amount equal to the distance D.

In a further non-limiting embodiment of the any of the foregoing embodiments, the annular combustor includes a forward end and an aft end, and the radially-outwardly extending flange is located at the aft end.

In a further non-limiting embodiment of the any of the foregoing embodiments, the annular combustor includes at least one opening at the forward end through which at least one corresponding fuel nozzle is received with a clearance gap distance G between the fuel nozzle and the opening, and D is less than G.

In a further non-limiting embodiment of the any of the foregoing embodiments, the stop member is affixed to a vane support ring.

In a further non-limiting embodiment of the any of the foregoing embodiments, the stop member is affixed with a fastener and the stop member includes an anti-rotation feature.

In a further non-limiting embodiment of the any of the foregoing embodiments, the anti-rotation feature includes an aft-projecting rail.

In a further non-limiting embodiment of the any of the foregoing embodiments, the aft-projecting rail includes a rounded end.

In a further non-limiting embodiment of the any of the foregoing embodiments, the radially-outwardly extending flange includes a radial slot that is slidingly engaged with a bushing that has a stop member located at an axially forward end thereof.

In a further non-limiting embodiment of the any of the foregoing embodiments, the bushing has a polygonal cross-section.

In a further non-limiting embodiment of the any of the foregoing embodiments, the stop member is integral with the static structure.

In a further non-limiting embodiment of the any of the foregoing embodiments, the stop member includes a circumferentially-extending arm that defines a circumferential slot in which the radially-outwardly extending flange is received.

In a further non-limiting embodiment of the any of the foregoing embodiments, the stop member is affixed to a turbine vane platform.

In a further non-limiting embodiment of the any of the foregoing embodiments, the stop member includes a ring structure, a tab extending radially inwardly from the ring structure and a circumferential flange extending opposite the tab, the circumferential flange being attached to the static structure.

A gas turbine engine according to an aspect of the present disclosure includes a static structure, a compressor section and an annular combustor in fluid communication with the compressor section. The annular combustor extends around a central axis and is located radially inwards of the static structure. The annular combustor includes an annular outer shell and an annular inner shell that define an annular combustion chamber there between. The annular combustor is free of any rigid attachments directly between the static structure and the annular outer shell. The annular outer shell includes a radially-outwardly extending flange. A turbine section is in fluid communication with the annular combustor. A stop member is rigidly connected with the static structure and is located adjacent the radially-outwardly extending flange such that axial-forward movement of the annular combustor is limited.

In a further non-limiting embodiment of the any of the foregoing embodiments, the stop member is axially-forwardly spaced apart by a distance D from the radially-outwardly extending flange such that movement of the annular combustor is limited to an amount equal to the distance D.

In a further non-limiting embodiment of the any of the foregoing embodiments, the annular combustor includes a forward end and an aft end, and the radially-outwardly extending flange is located at the aft end.

In a further non-limiting embodiment of the any of the foregoing embodiments, the annular combustor includes at least one opening at the forward end through which at least one corresponding fuel nozzle is received with a clearance gap distance G between the fuel nozzle and the opening, and D is less than G.

In a further non-limiting embodiment of the any of the foregoing embodiments, the stop member is affixed with a fastener and the stop member includes an anti-rotation feature.

A method for controlling movement of a combustor in a gas turbine engine, according to an aspect of this disclosure includes limiting axial-forward movement of an annular combustor in a gas turbine engine using a stop member that is axially-forwardly spaced apart by a distance D from a radially-outwardly extending flange on an annular outer shell of the annular combustor such that axial-forward movement of the annular combustor is limited to an amount equal to the distance D.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION OF THE PREFERRED EMBODIMENT

Figure 1:
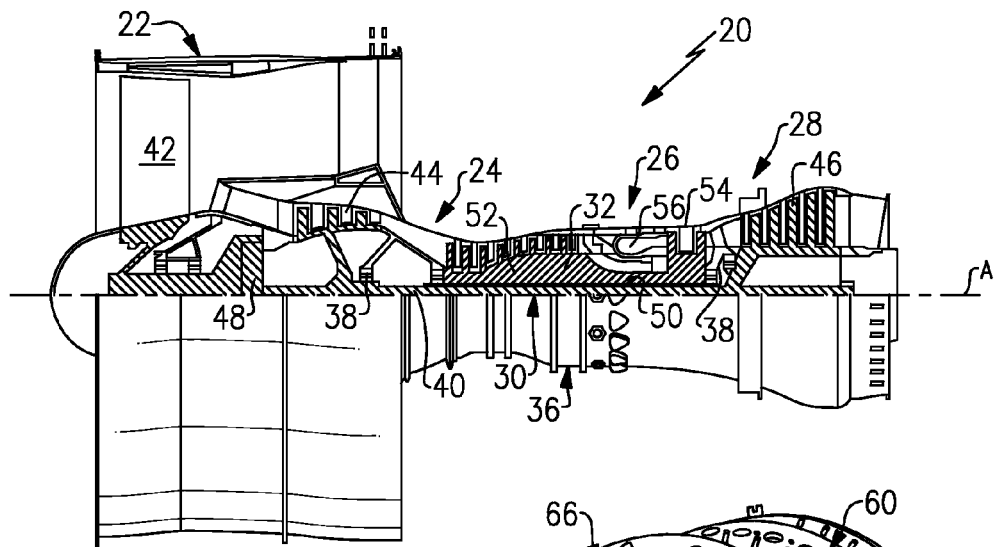
FIG. 1 illustrates an example gas turbine engine.

FIG. 1 illustrates an example gas turbine engine 20. The gas turbine engine 20 is disclosed herein as a high bypass, two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 receives air along a core flowpath for compression and presentation into the combustor section 26 then expansion through the turbine section 28. Although depicted as a turbofan gas turbine engine in the disclosed non-limiting embodiment, it should be understood that the concepts described herein are not limited to use with turbofans and the teachings may be applied to other types of turbine engines, including three-spool architectures and ground-based turbines that do not include the fan section 22.

The gas turbine engine 20 generally includes a low spool 30 and a high spool 32 mounted for rotation about an engine central longitudinal axis A relative to an engine static structure 36 via several bearing systems 38. It should be understood that various bearing systems 38 at various locations may alternatively or additionally be provided.

The low spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low spool 30. The high spool 32 includes an outer shaft 50 that interconnects a high pressure compressor 52 and high pressure turbine 54. It is to be understood that "low pressure" and "high pressure" as used herein are relative terms indicating that the high pressure is greater than the low pressure. An annular combustor 56 is arranged between the high pressure compressor 52 and the high pressure turbine 54. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the annular combustor 56, then expanded over the high pressure turbine 54 and low pressure turbine 46. The turbines 46 and 54 rotationally drive the respective low spool 30 and high spool 32 in response to the expansion.

Figure 2A:
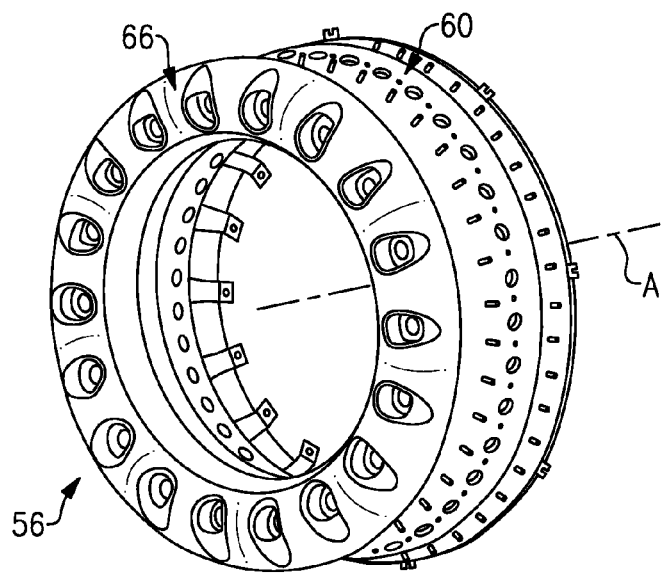
FIG. 2A illustrates a perspective view of an annular combustor.
Figure 2B:
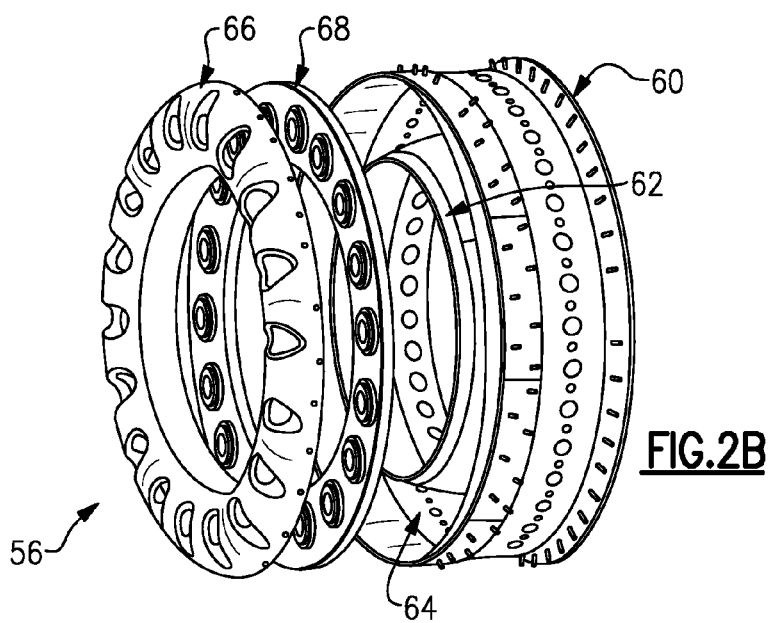
FIG. 2B illustrates an expanded view of the annular combustor of FIG. 2A.

FIG. 2A shows a perspective, isolated view of the annular combustor 56, and FIG. 2B shows an exploded perspective view of the annular combustor 56. In this example, the annular combustor 56 is a 4-piece construction that includes an annular outer shell 60, an annular inner shell 62 that is radially inwardly spaced from the annular outer shell 60 to define an annular combustion chamber 64 there between, an annular hood 66 and a bulkhead 68 that is secured to the annular outer shell 60, annular inner shell 62 and annular hood 66. The annular outer shell 60, the annular inner shell 62, the annular hood 66 and the bulkhead 68 each extend circumferentially around the engine central longitudinal axis A.

Figure 3A:
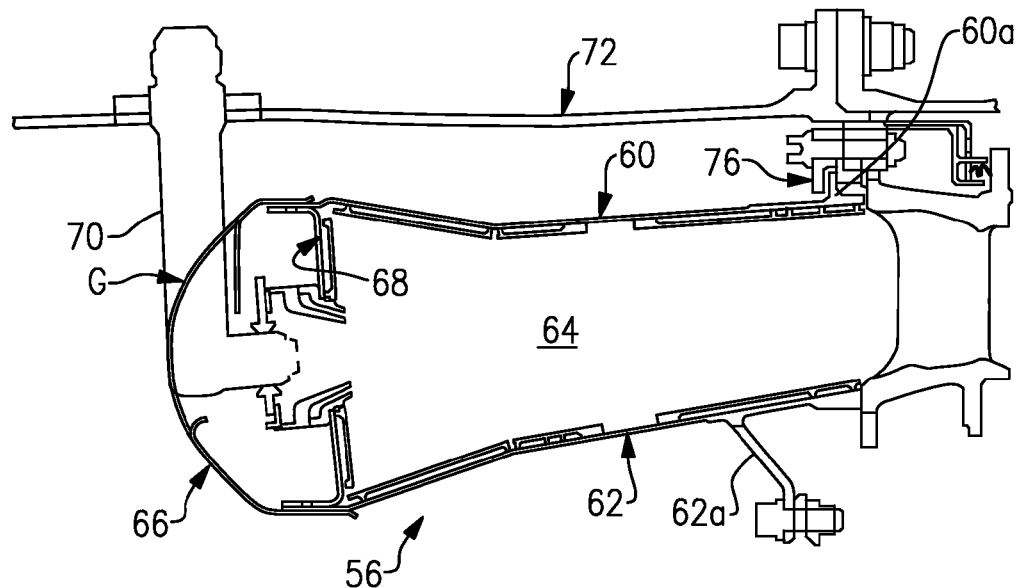
FIG. 3A illustrates a cross-section of an annular combustor.
Figure 3B:
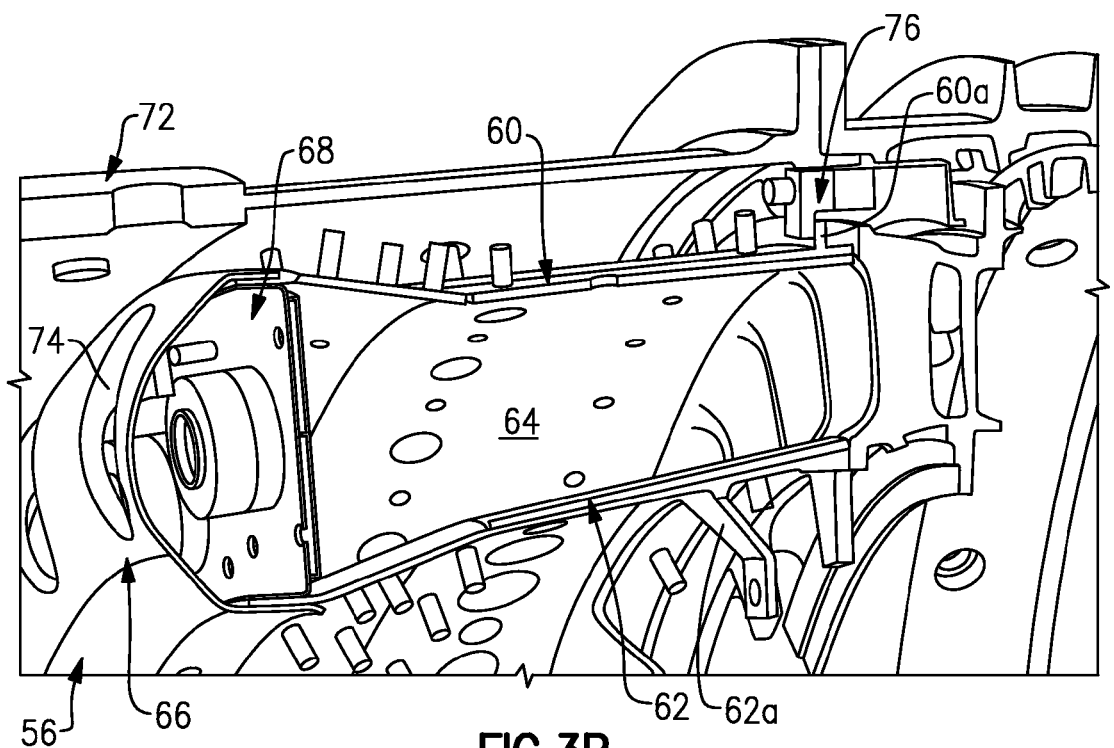
FIG. 3B illustrates a perspective view of the annular combustor of FIG. 3A.

FIG. 3A shows a cross-section of the annular combustor 56, and FIG. 3B shows a sectioned, perspective view of the annular combustor 56. The annular inner shell 62 includes a plurality of radially-inwardly extending flanges 62a (one shown) that rigidly affix the annular combustor 56 within the gas turbine engine 20. A plurality of fuel nozzles 70 (one shown) extend from an outer static structure 72 through corresponding openings 74 in the annular hood 66 that is located at the forward end of the annular combustor 56. It is to be understood that relative positional terms, such as "forward," "aft," "upper," "lower," "above," "below," and the like are relative to the normal operational attitude of the gas turbine engine 20 and should not be considered otherwise limiting.

The annular outer shell 60 is free of any free of any rigid attachments directly between the static structure 72 and the annular outer shell 60. In this regard, the annular combustor 56 is "free floating" within the gas turbine engine 20 such that the flanges 62a provide the exclusive rigid support. The term "rigid" and variations thereof as used herein refer to a support that resists deformation under the weight of the annular combustor 56 and under the loads generated in operation of the gas turbine engine 20. Rigid supports, such as the flanges 62a, thus support the weight of the annular combustor 56 under the loads generated in operation, while a flexible or non-rigid support could not bear the weight of the annular combustor 56 under such loads.

Certain events in the operation of the gas turbine engine 20 can cause the annular combustor 56 to move axially forward. As an example, a surge event in the gas turbine engine 20 can cause a back pressure that tends to urge the annular combustor 56 forward in a pivot motion about the flanges 62a. At least a component of the pivot motion is in an axially forward direction. If the axially-forward component of the motion is substantial, the fuel nozzle 70 can come into contact with the sides of the openings 74. A plurality of stop members 76 are therefore used in combination with a radially-outwardly extending flange 60a of the annular outer shell 60 to limit axial-forward motion of the annular combustor 56. Because the stop members 76 are used to limit movement, the annular combustor 56 does not need to be made more structurally robust, such as with thicker walls, to resist movement.

Figure 4:
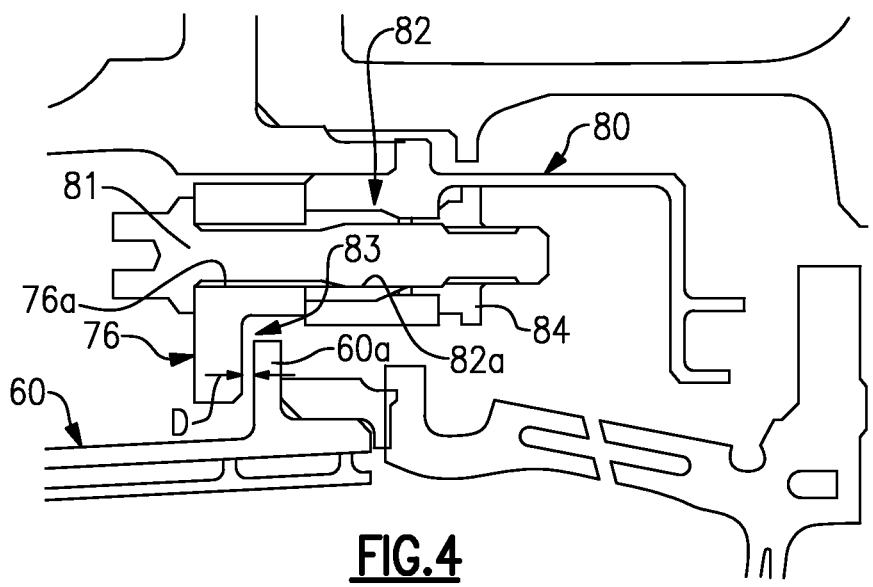
FIG. 4 illustrates a cross-section of a stop member.

FIG. 4 shows an expanded cross-section of the stop member 76 and the radially-outwardly extending flange 60a. The radially-outwardly extending flange 60 extends completely around the annular outer shell 60. The stop member 76 is rigidly connected with the static structure 72 and is axially-forwardly spaced apart by a distance D, such as 0.010-0.050 inches (0.254-1.27 millimeters), from the radially-outwardly extending flange 60a. Thus, the stop member 76 limits the axial-forward movement of the annular combustor 56 by an amount that is equal to the distance D. The annular outer shell 60 of the annular combustor 56 is still free-floating in that it is not rigidly affixed to any other structure, but the stop member 76 limits movement in excess of the distance D to thereby ensure that the sides of the openings 74 do not contact the fuel nozzles 70.

As an example, the distance D between the radially-outwardly extending flange 60a and the stop member 76 is selected such that the distance D is less than a gap distance, represented as distance G in FIG. 3A, between the fuel nozzle 70 and corresponding sides of the opening 74. Thus, the annular combustor 56 is permitted to move, but only by an amount that avoids contact between the fuel nozzles 70 and the sides of the openings 74.

Figure 5:
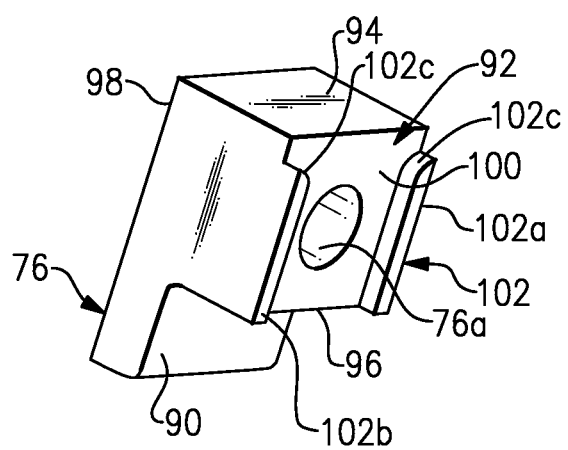
FIG. 5 illustrates an isolated view of a stop member.

Referring also to FIG. 5, the stop member 76 in this example is a distinct piece that is secured onto a vane support ring 80 of the static structure 72 in the gas turbine engine 20. In one example, six stop members 76 are uniformly circumferentially secured around the vane support ring 80, although the number of stop members 76 will vary depending on the weight of the annular combustor 56 and loads generated during operation. Because the stop members 76 are distinct pieces that are secured onto the vane support ring 80, the annular combustor 56 can first be assembled to the vane support ring 80 prior to securing the stop members 76. Thus, the stop members 76 do not hinder assembly of the annular combustor 56 to the vane support ring 80.

The stop member 76 includes an opening 76a through which a fastener 81 is received to secure the stop member 76 and the vane support ring 80 together. In a further example, the fastener 81 is a bolt that is received through the opening 76a and a corresponding opening 82a in a boss 82 of the vane support ring 80. The fastener 81 is secured using a nut 84 such that the stop member 76 is rigidly affixed.

The stop member 76 includes a radially-extending flange 90 that extends from a boss 92, which includes the opening 76a for securing the stop member 76 as described above. The boss 92 extends between a radially outer side 94, a radially inner side 96, a forward side 98 and an aft side 100. Optionally, the aft side 100 of the stop member 76 includes anti-rotation features 102 that ensure proper orientation of the stop member 76 when it is secured to the boss 82 of the vane support ring 80.

In this example, the anti-rotation features 102 include aft-projecting rails 102a and 102b that flank the opening 76a. The rails 102a and 102b extend from the radially inner side 96 of the boss 92 toward the radially outer side 94, but in this example do not extend all the way to the radially outer side 94. The rails 102a and 102b include respective rounded ends 102c that act as sliding surfaces when the stop member 76 is assembled onto the boss 82. That is, the rounded ends 102c receive and guide the boss 82 there between as the stop member 76 is slid onto the boss 82. The rails 102a and 102b thus flank the boss 82 and thereby limit rotation of the stop member 76 about the central axis of the opening 76a as the fastener 81 is tightened to secure the stop member 76.

In a further example, the radially-outwardly extending flange 60a, the stop member 76, the fastener 81, the nut 84 and the boss 82 are designed such that, given the expected thermal expansions of each of these components, which are made of a metal alloy or alloys, during engine 20 operation, there is the distance D between the radially-outwardly extending flange 60a and the stop member 76. Further, the radially-outwardly extending flange 60a, the stop member 76, the fastener 81, the nut 84 and the boss 82 may be designed with expansion gaps, such as gap 83, to maintain clearance between moving parts and thus reduce wear.

Figure 6:
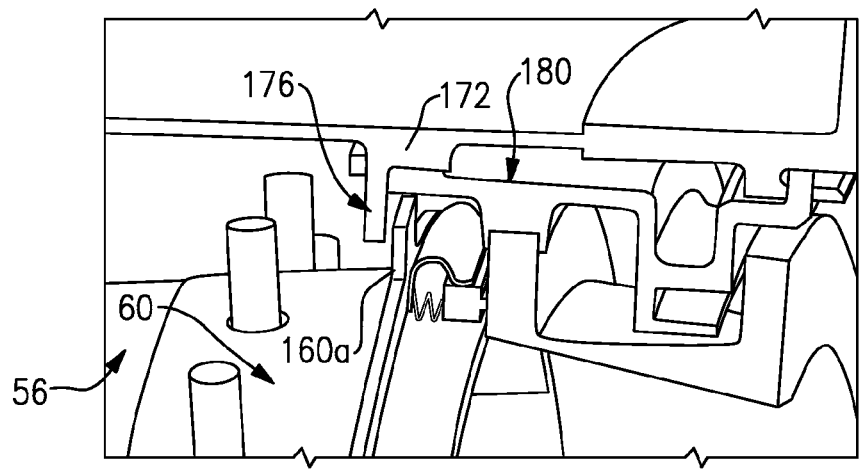
FIG. 6 illustrates a perspective view of another example stop member.

FIG. 6 shows another embodiment of a stop member 176. In this disclosure, like reference numerals designate like elements where appropriate and reference numerals with the addition of one-hundred, or multiples thereof, designate modified elements that are understood to incorporate the same features and benefits of the corresponding elements. In this embodiment, the annular outer shell 60 includes a plurality radially-outwardly extending flanges 160a that are discreet tabs. The flanges 160a are uniformly circumferentially spaced about the annular outer shell 60, for example.

The stop member 176 is axially-forwardly spaced apart from the radially-outwardly extending flange 160a and extends from a static structure 172, such as a case, that surrounds or partially surrounds the annular combustor 56. In one example, the static structure 172 is a diffuser case. The stop member 176 is integrally formed with the static structure 172. Alternatively, the stop member 176 is a separate and distinct piece that is affixed to the static structure 172.

Figure 7A:
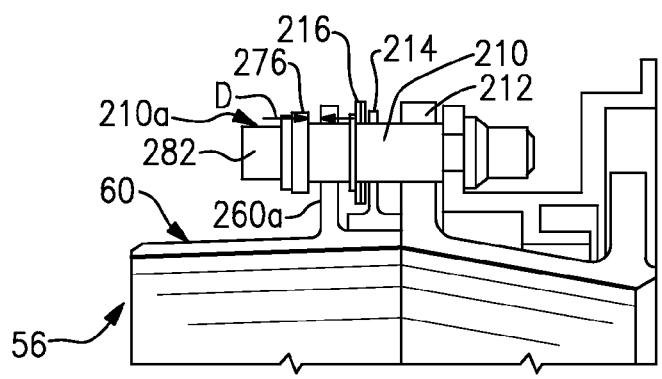
FIG. 7A illustrates a cross-section of another example stop member.
Figure 7B:
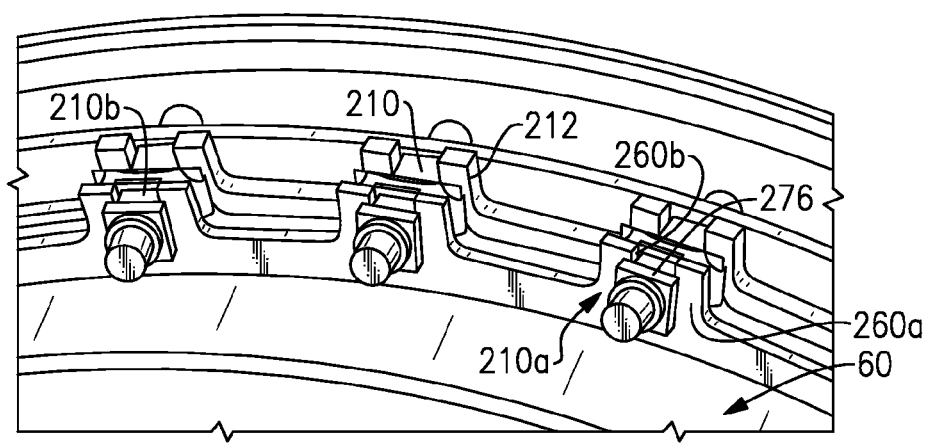
FIG. 7B illustrates a perspective view of the stop member of FIG. 7A.

FIG. 7A shows a cross-section of another example stop member 276, and FIG. 7B shows a perspective view of the stop member 276. In this example, the annular outer shell 60 includes a plurality of radially-outwardly extending flanges 260a that have radial slots 260b. The radial slots 260b of the flanges 260a fit over corresponding bushings 210 that are rigidly affixed to a turbine vane platform 212. Each of the bushings 210 includes a forward end 210a, which includes a corresponding stop member 276. The bushings 210 are secured to the turbine vane platform 212 of static structure 272 using a fastener 282 to provide the axial distance D between the stop member 276 and the flange 260a. Optionally, a clamp member 214 and spring washer 216 (FIG. 7A) are provided between the turbine vane platform 212 and the flange 260a.

The bushing 210 has a polygonal cross-section 210b. In this example, the polygonal cross-section is rectangular or square such that the sides of the bushing 210 function as a bearing surface for sliding contact with the sides of the radial slots 260b of the flanges 260a. Thus, the sides of the bushing 210 guide axial movement of the annular combustor 56. The stop member 276 has an enlarged cross-section relative to the polygonal cross-section of the bushing 210. Thus, forward movement of the annular combustor causes the flange 260a to butt against the stop member 276 and prevent further axial-forward movement of the annular combustor 56.

Figure 8A:
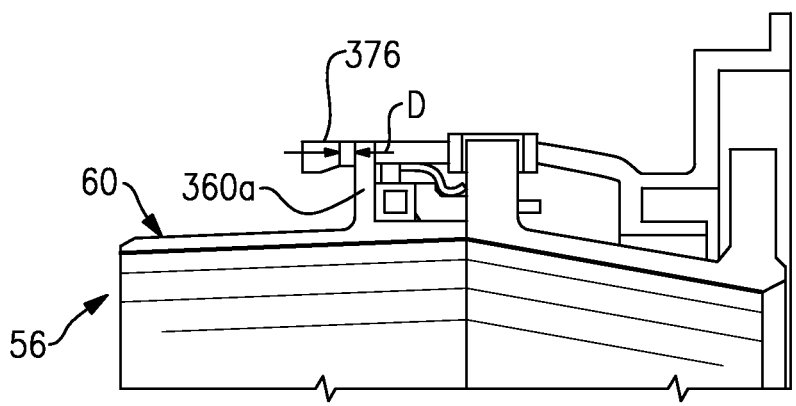
FIG. 8A illustrates a cross-section of another example stop member.
Figure 8B:
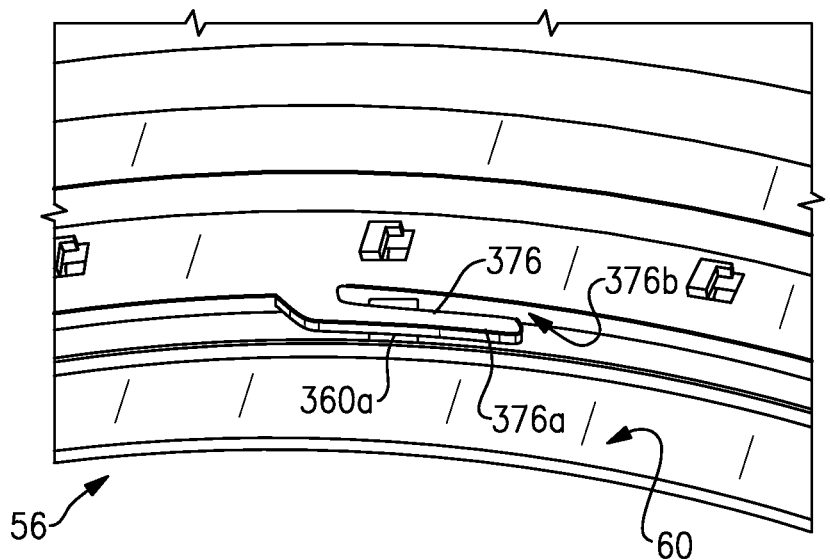
FIG. 8B illustrates a perspective view of the stop member of FIG. 8A.

FIG. 8A illustrates a cross-section of another stop member 376, and FIG. 8B illustrates a perspective view of the stop member 376. In this example, the stop member 376 is a circumferential arm 376a of static structure 372 that defines a circumferential slot 376b. A radially-outwardly extending flange 360a of the annular outer shell 60 is received into the circumferential slot 376b. As an example, the radial size of the circumferential slot 376b is larger than the axial thickness of the flange 360a such that there is a distance D between the forward side defining the circumferential slot 376b and the flange 360a. Thus, the stop member 376 limits axial-forward movement of the annular combustor 56, as described above.

Figure 9A:
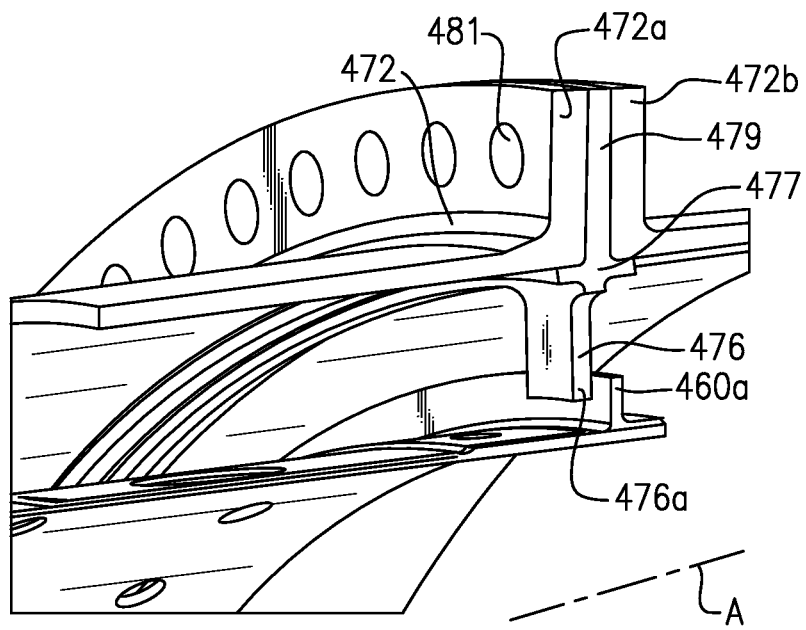
FIG. 9A illustrates a perspective view of another example stop member.
Figure 9B:
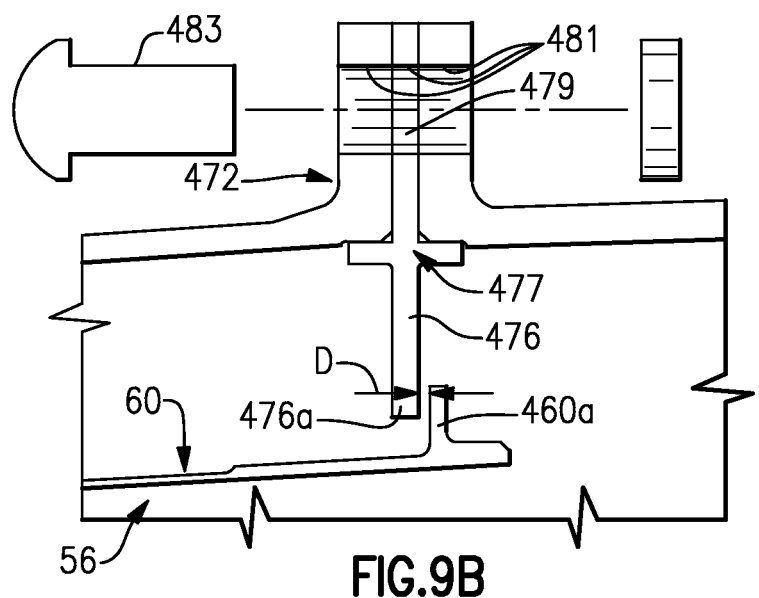
FIG. 9B a cross-section of the stop member of FIG. 9A.

FIG. 9A illustrates a perspective, cutaway view of another stop member 476, and FIG. 9B illustrates a cross-section of the stop member 476. In this example, the stop member 476 includes tabs 476a (one shown) that extends radially inwardly from the outer static structure 472 such that there is a distance D between the forward side of the flange 460a and the aft side of the tab 476a. Thus, the stop member 476 limits axial-forward movement of the annular combustor 56, as described above.

The stop member 476 includes a ring structure 477 from which the tabs 476a extend. The ring structure 477 extends around the engine central axis A and includes a circumferential flange 479 that extends radially in a direction opposite of the tabs 476*a*. The circumferential flange 479 is secured between a first flange 472*a* and a second flange 472*b* of the outer static structure 472. The circumferential flange 479, first flange 472*a* and second flange 472*b* include openings 481 that align to receive a fastener 483 (FIG. 9A), such as a bolt, there through to secure the circumferential flange 479 between the first flange 472*a* and the second flange 472*b*.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A combustor assembly for a gas turbine engine, comprising:
    a static structure;
    an annular combustor extending around a central axis and being located radially inwards of the static structure, the annular combustor including an aft end, a forward end with at least one opening through which at least one fuel nozzle is received with a clearance gap distance G between the fuel nozzle and the opening, and an annular outer shell and an annular inner shell that define an annular combustion chamber there between, the annular combustor being free of any rigid attachments directly between the static structure and the annular outer shell, the annular outer shell including a radially-outwardly extending flange; and
    a stop member rigidly connected with the static structure and axially-forwardly spaced apart by a distance D from the radially-outwardly extending flange such that axial-forward movement of the annular combustor, with respect to directionality defined by the forward end and the aft end, is limited to an amount equal to the distance D, and the distance D is less than the clearance gap distance G.

2. The combustor assembly as recited in claim 1, wherein the radially-outwardly extending flange is located at the aft end.

3. The combustor assembly as recited in claim 1, wherein the radially-outwardly extending flange is annular.

4. The combustor assembly as recited in claim 1, wherein the stop member is affixed to a vane support ring.

5. The combustor assembly as recited in claim 4, wherein the stop member includes an opening through which a fastener extends, and the stop member includes an anti-rotation feature limiting rotation of the stop member about a central axis of the opening.

6. The combustor assembly as recited in claim 4, wherein the stop member is affixed with a fastener and the stop member includes an anti-rotation feature.

7. The combustor assembly as recited in claim 6, wherein the anti-rotation feature includes an aft-projecting rail.

8. The combustor assembly as recited in claim 7, wherein the aft-projecting rail includes a rounded end.

9. The combustor assembly as recited in claim 1, wherein the radially-outwardly extending flange includes a radial slot that is slidingly engaged with a bushing that has the stop member located at an axially forward end thereof.

10. The combustor assembly as recited in claim 9, wherein the bushing has a polygonal cross-section.

11. The combustor assembly as recited in claim 1, wherein the stop member is integral with the static structure.

12. The combustor assembly as recited in claim 1, wherein the stop member includes a circumferentially-extending arm that defines a circumferential slot in which the radially-outwardly extending flange is received.

13. The combustor assembly as recited in claim 1, wherein the stop member is affixed to a turbine vane platform.

14. The combustor assembly as recited in claim 1, wherein the stop member includes a ring structure, a tab extending radially inwardly from the ring structure and a circumferential flange extending opposite the tab, the circumferential flange being attached to the static structure.

15. A gas turbine engine comprising:
    a static structure;
    a compressor section;
    an annular combustor in fluid communication with the compressor section, the annular combustor extending around a central axis and being located radially inwards of the static structure, the annular combustor including an aft end, a forward end through which at least one fuel nozzle is received, and an annular outer shell and an annular inner shell that define an annular combustion chamber there between, the annular combustor being free of any rigid attachments directly between the static structure and the annular outer shell, the annular outer shell including a radially-outwardly extending flange;
    a turbine section in fluid communication with the annular combustor; and
    a stop member rigidly affixed with a fastener to a vane support ring on the static structure and adjacent the radially-outwardly extending flange such that axial-forward movement of the annular combustor is limited, with respect to directionality defined by the forward end and the aft end; and
    anti-rotation features limiting rotation of the stop member with respect to the vane support ring, the anti-rotation features including opposed projecting rails flanking an opening in the stop member through which the fastener extends.

16. The gas turbine engine as recited in claim 15, wherein the rails are radially elongated.

17. The gas turbine engine as recited in claim 15, wherein the rails have rounded radially outer ends.

18. The gas turbine engine as recited in claim 15, wherein radially outer ends of the rails stop radially inwards of a radially outer side of the stop member.

19. The gas turbine engine as recited in claim 15, wherein the stop member is axially-forwardly spaced apart by a distance D from the radially-outwardly extending flange such that movement of the annular combustor is limited to an amount equal to the distance D.

20. The gas turbine engine as recited in claim 19, wherein the radially-outwardly extending flange is located at the aft end.

21. The gas turbine engine as recited in claim 20, wherein the annular combustor includes at least one opening at the forward end through which the at least one fuel nozzle is received with a clearance gap distance G between the fuel nozzle and the opening, and D is less than G.

22. A method for controlling movement of a combustor in a gas turbine engine, the method comprising:

in a combustor assembly that includes a static structure and an annular combustor that extends around a central axis and is located radially inwards of the static structure, the annular combustor including an aft end, a forward end through which at least one fuel nozzle is received, and an annular outer shell and an annular inner shell that define an annular combustion chamber there between, limiting axial-forward movement of the annular combustor in a gas turbine engine, with respect to directionality defined by the forward end and the aft end, using a stop member that is axially-forwardly spaced apart by a distance D from a radially-outwardly extending flange on the annular outer shell of the annular combustor such that the axial-forward movement of the annular combustor is limited to an amount equal to the distance D.

\* \* \* \* \*